April 8, 1947.  F. C. MACKEY  2,418,650
METHOD OF DRYING, PREHEATING, BURNING AND COOLING CERAMIC WARE
Filed July 23, 1945  3 Sheets-Sheet 1
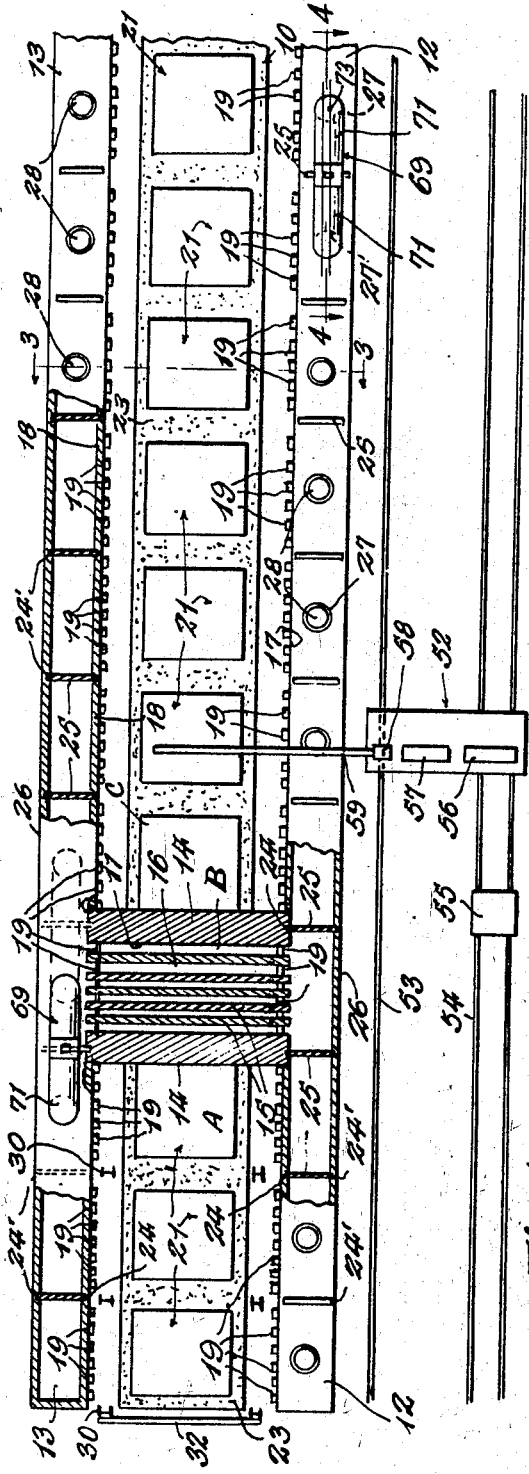
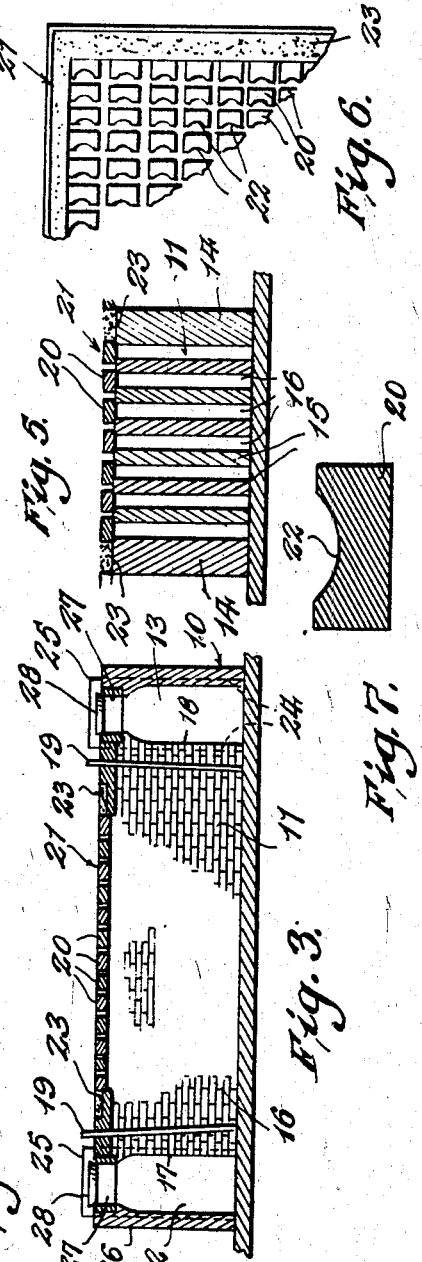
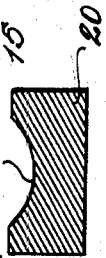
INVENTOR.
Frank C. Mackey,
BY
Christian R. Nielsen
ATTORNEY.

April 8, 1947.  F. C. MACKEY  2,418,650
METHOD OF DRYING, PREHEATING, BURNING AND COOLING CERAMIC WARE
Filed July 23, 1945   3 Sheets-Sheet 2
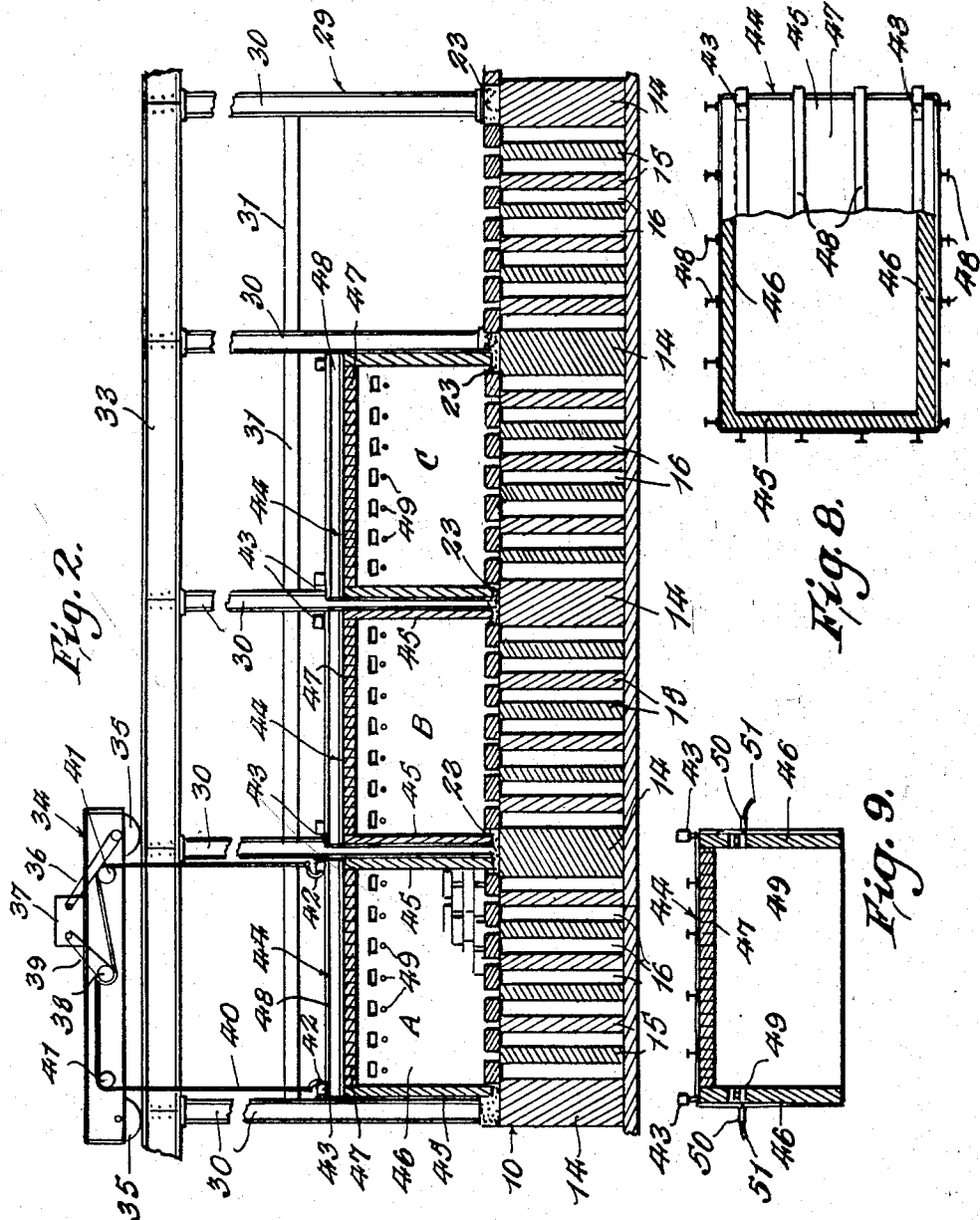
INVENTOR.
Frank C. Mackey,
BY Christian R. Nielsen
ATTORNEY.

April 8, 1947.  F. C. MACKEY  2,418,650
METHOD OF DRYING, PREHEATING, BURNING AND COOLING CERAMIC WARE
Filed July 23, 1945  3 Sheets-Sheet 3
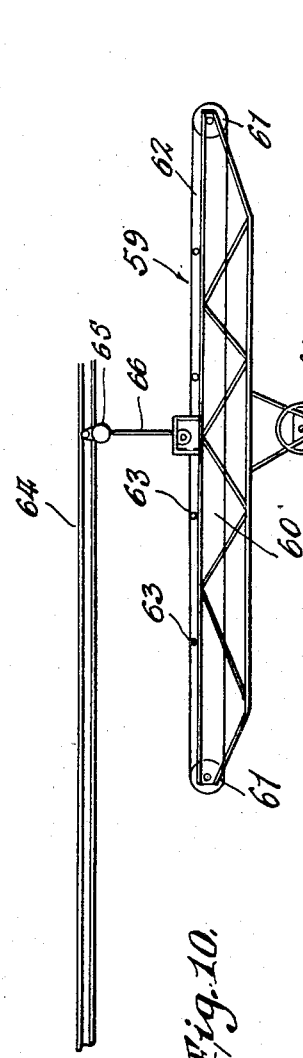
Fig. 10.
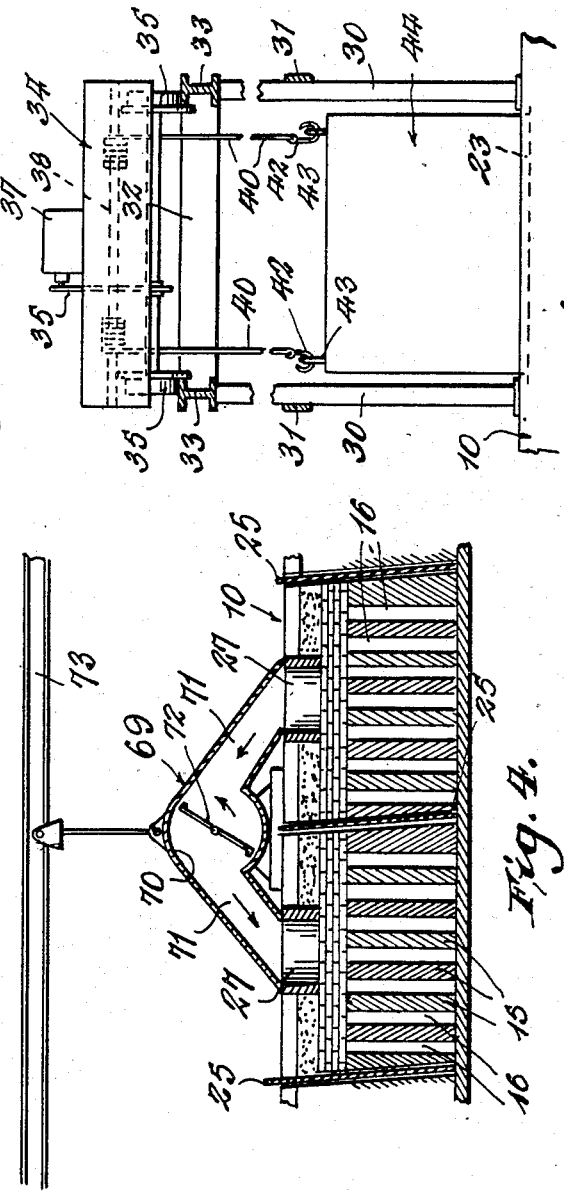
Fig. 11.
Fig. 4.
Inventor
Frank C. Mackey.
By Christian R. Nielsen.
Attorney Patented Apr. 8, 1947

2,418,650

UNITED STATES PATENT OFFICE 2,418,650

METHOD OF DRYING, PREHEATING, BURNING, AND COOLING CERAMICWARE

Frank C. Mackey, Laurel, Md.

Application July 23, 1945, Serial No. 606,589

6 Claims. (Cl. 25—157)

1

This invention relates to a method of drying, preheating, burning and cooling ceramic ware, and it consists in the constructions, arrangements and combinations herein described and claimed.

It is an important object of the invention to provide a kiln for the burning of bricks and other ceramic articles, and particularly aims for a reduction in fuel consumption, in that the heat employed in one stage of operation of the kiln may be passed on to the next stage, loss of heat being thus prevented, due to the fact that the combination burners are not removed during operation, which fact also prevents scumming of brick, due to exposure to the atmosphere.

More particularly, it is an object of the invention to provide a kiln in which the pallets of the kiln are arranged between a pair of hot air tunnels, the tunnels being connected to respective pallets and including damper devices for control of hot air between the tunnels and respective pallets.

It is also an object of the invention to provide the hot air tunnels with a plurality of damper devices, dividing the tunnels into compartments, each compartment being complemental to a respective pallet of the kiln, and further including means whereby hot air from one compartment may be exhausted and discharged into another compartment of a tunnel.

It is a still further important object of the invention to provide a kiln construction wherein sealing costs and labor is minimized; and wherein the costs of repair to walls, hoods and floor edges of the kiln are eliminated, inasmuch as expansion and contraction between the various parts constituting the kiln are not inherent.

It is also an object of the invention to provide a kiln construction wherein handling of brick is minimized and in which the kilns are accessible from any direction.

Additional objects, advantages and features of invention will be apparent from the following description considered in conjunction with the accompanying drawing, wherein Figure 1 is a fragmentary top plan view of a kiln, partly in section, of a kiln constructed in accordance with the invention.

Figure 2 is a fragmentary longitudinal section through the kiln.

Figure 3 is an enlarged cross section on the line 3—3 of Figure 1.

Figure 4 is a cross section on the line 4—4 of Figure 1.

2

Figure 5 is an enlarged vertical section through one of the pallets.

Figure 6 is a fragmentary top plan view thereof.

Figure 7 is an enlarged cross section of one of the units employed in constructing a pallet.

Figure 8 is a horizontal section through one of the combined preheater-burner-cooling hoods employed with the kiln.

Figure 9 is a vertical section therethrough.

Figure 10 is a fragmentary side elevation of a conveyor employed with the kiln.

Figure 11 is a cross section of an overhead trackway employed with the kiln.

There is illustrated a kiln 10 consisting of a battery kiln compartments 11 arranged in tandem relation and upon one side and connected with each compartment there is a burning tunnel 12, while upon the other side a drying tunnel 13 is similarly arranged and connected. The kiln and tunnels may be constructed from materials such as now employed in erection of brick and similar plants.

As best seen in Figures 1 and 2, the kiln 10 consists of a series of thick walls 14 equally spaced apart, and between these walls there are erected walls 15 equally spaced to define compartments 16. Respective kiln chambers 11 are thus formed. The walls 14 and 15 are of the same height as may be seen in Figure 2, and are of lengths so as to extend from the adjacent wall 17 of the burner tunnel 12 to the wall 18 of the dryer tunnel 13, the compartments 16 forming communications between the tunnels for a purpose presently to be explained.

Inwardly of respective ends of the kiln compartments 11 and vertically slidable between the walls 14 and 15, there are arranged plate valves 19 of a length so as to project above the roof of the kiln, as may be seen in Figure 3. These plate valves 19 may be raised and lowered so as to control passage of heated air between the tunnels 12 and 13 and the kilns, as will be explained hereinafter.

Upon the upper edges of the walls 14 and 15, bricks 20 are laid and secured so as to cover the entire surface between a pair of walls 14, these bricks constituting a pallet 21 upon which brick are to be supported. The bricks 20 are laid longitudinally along the walls 14 and 15 in spaced relation for circulation purposes and in addition, each brick is formed with a recess or relieved part 22 for further permitting circulation.

A trough 23 is formed in the roof of the kiln circumscribing each pallet 21 within which sand is deposited, forming a seal for the combination burner presently to be described.

The tunnels 12 and 13 are of identical construction, and a description of one will be sufficient for an understanding of the invention. Each of the walls 14 is formed with a vertical guide-way 24 and the outer wall 26 is provided with a similar guide-way 24', and in alignment therewith, to receive a plate valve 25. It will thus be seen that each kiln compartment 11 and the tunnels are interconnected, yet the circulation of heated air therebetween may be controlled through required adjustments of the plate valves 19 and 25, as will be explained. Circular openings 27 are formed in the roof of the tunnel, spaced centrally between the plate valves 25, closed by a removable cover 28.

Attention is now invited to Figures 1, 2 and 11 of the drawings, wherein there is shown a frame structure 29 erected upon the roof of the kiln, the frame consisting of upright beams 30 suitably spaced longitudinally between the kiln compartments 11 and respective tunnels 12 and 13. The upright beams 30 may be suitably braced for rigidity by customary practice, but as here shown, longitudinal stringers 31 are connected between the uprights and the end uprights are connected transversely by stringers 32. It will be noted that two rows of uprights are thus provided and upon the upper ends of aligned uprights, respective I-beams 33 are securely mounted, these beams serving as a track, for a traversing hoist 34.

There are numerous hoists now available for the purposes intended here, and a detailed showing of a particular construction is not believed essential to a clear understanding of the operation. Briefly, the hoist includes traction wheels 35, one pair of which may be driven through a drive 36 from a motor 37. The motor 37 is also employed to drive a drum 38 through a drive 39. Upon the drum 38 cables 40 are wound adjacent each end of the drum, the cables being trained about guide and support pulleys 41 mounted at respective ends of the hoist. The free ends of the cables are provided with hooks 42 for detachable connection with respective eyes 43 secured in the top wall of hood devices generally indicated at 44, which will now be described, attention being directed to Figures 2, 8 and 9.

As may be seen in Figure 8, the hood 44 is substantially rectangular as seen in plan, consisting of respective end walls 45, side walls 46 and a top wall 47, these walls being securely connected and reinforced by I-beams 48. In the side walls 46 adjacent the top wall 47, a plurality of openings 49 are formed through which flames from burners 50 are projected into the interior of the hood. The burners 50 may be secured upon the walls in any approved manner, and inasmuch as the hoods 44 are to be moved from one pallet to another, the fuel lines 51 are of a flexible character, as will be understood.

To facilitate the handling of brick, or other articles, a traversing forming and conveyor device 52 is employed, now to be described, reference being made to Figure 1.

A single track 53 is arranged parallel to the kiln 10, and spaced therefrom a pair of trackways 54 are provided. The forming device 52 is movably mounted on the single track 53 and one of the tracks 54. A shuttle car 55 traverses the tracks 54 delivering clay to the feeder 56 from whence the clay is passed to the mill 57 and then to the cutting device 58. An endless conveyor 59 receives the brick from the cutting device for delivery to a kiln. As may be seen in Figure 10, the conveyor consists of a suitably trussed elongated frame 60 respective ends of which revolubly support rollers 61 about which an endless conveyor belt 62 is trained. The upper reach of the belt is supported by idler rollers 63 to prevent undue sagging under a load of bricks. The belt may be driven by any suitable means, not shown.

Inasmuch as the forming device 52 is to be moved longitudinally along the kiln into position before respective pallets, it will be necessary to provide means for moving the conveyor 59, and in the present instance, I have illustrated an overhead track 64 extended longitudinally beside the kiln. A traversing hoist 65 is mounted on the track 64 and includes a hoisting cable 66, the lower end of which is detachably connected medially of the conveyor frame 60, as indicated at 67.

The frame 60 also includes a pair of medially located traction wheels 68, whereby the conveyor may be moved along the ground for adjustment of the latter between a pallet and the forming device.

As has been stated, it is intended to employ heat developed in one kiln for use in another kiln and in order that this may be accomplished, a combined exhaust and blower fan 69 is employed, as clearly shown in Figure 4. The fan consists of a central cylindrical housing 70 from which a pair of ducts 71 are extended, these ducts being so spaced and shaped as to register with a pair of openings 27 of a tunnel. An impeller 72 is axially and revolubly mounted in the cylindrical portion of the housing and is driven by any suitable motor, not shown. To facilitate movement of the combined exhaust and blower, it is suitably suspended from an overhead track 73.

In use, the bricks are formed according to practices now followed, and with the conveyor 59 extended between the forming device and a pallet 21 of one of the kilns, green bricks are loaded on the conveyor for delivery along the conveyor, where workmen remove the brick and place them upon the pallet. The brick may be set on the pallet from twelve to eighteen courses high, this depending on production required.

After completing the placement of the brick on the pallet, a combination drier, burner and cooler 44 is set down over the pallet by means of the traversing hoist 34, as indicated at A in Figure 2. The lower edges of the walls of the combination drier, burner and cooler will be firmly seated in the sand of the trough 23 forming a seal therearound. A second combination burner 44 is then placed over an empty pallet as indicated at B, sealed in the sand trough, as in the first instance, and the burners 50 are lighted to raise the temperature within the hood to a drying temperature. The dampers 19 of both kilns controlling passage to the drying tunnel 13 are then raised to form communication between the compartments 16 and the tunnel. A combination exhaust and blower 69 is next placed upon adjacent openings 27 of the tunnel, the exhaust duct 71 being arranged upon the opening 27 associated with the burning combination burner, as shown in Figure 4. With rotation of the impeller 72 as indicated by the arrow, hot air will be drawn downwardly through the pallet of the kiln indicated at B, and through the chambers 16 for discharge into the drying tunnel on the opposite side of the damper 25 which divides the tunnel between the kilns A and B. The hot air thus must pass into the chambers 16 of kiln A and upwardly through the pallet of kiln A with consequent drying of the brick within the kiln preliminary to burning of the brick. Usually the brick would be dried and pre-heated over night, and pre-heating of the brick may be attained by raising the temperature in the combination burner over kiln B. The pallet next adjacent the kiln having the burning combination burner thereover would next be attached with green brick, the forming device having been moved along the trackway so as to properly position the conveyor with respect to the pallet.

The dampers 19 of kiln A are lowered after pre-heating so as to close communication with the drying tunnel 13 and the burners 50 of hood associated with kiln A are lighted for burning of the dried and pre-heated brick in kiln A. The combined exhaust and blower 69 is removed from the openings 27 of the drying tunnel, the closure plate being replaced on the opening associated with kiln A. The combined exhaust and blower 69 is next arranged between the opening 27 of kiln B and a similar opening of the next kiln which will be designated C, as indicated in dotted lines in Figure 1. Thus with a combination burner 44 disposed over the green brick on the pallet in kiln C, hot air may be drawn from kiln B and discharged into kiln C, the dampers 19 of kiln C having been adjusted for admission of hot air, as will be understood.

After burning the brick in kiln A, and the burners 50 extinguished, the damper 25 of the burner tunnel, positioned between kilns A and B may be raised so that the hot air may be drawn through the burner tunnel for discharge into kiln C by use of a combination blower and exhaust 69, the dampers 19 between the burner tunnel and the kiln having been properly adjusted for the purpose. After a suitable length of time so as to exhaust hot air from kiln A, and cooling of the brick, the combination burner 44 thereover may be elevated above and moved beyond the operating combination burners by means of the traversing hoist 34 into position over another kiln previously stacked with green brick for drying and pre-heating purposes, advantage being taken of hot air in the drying and burning tunnels through adjustment of the dampers 19 and 25. The dampers may also be adjusted so as to provide necessary draft for burning. This procedure is followed throughout the length of the kiln proper and when the final unit is reached, the operation is reversed, it being only necessary to reverse the combined blower and suction device to effect a reverse movement of hot air.

In setting green brick taken from conveyor belt by setters when compartment kilns are used and kiln is almost filled and conveyor belt moved near partition wall between kilns, the usual practice of setting can not be done as men and conveyor are over place where brick are to be set. In order to set this part of the kiln enough bricks have to be stacked on top of bricks that have been set to fill the space of about four feet, which can not be filled until conveyor has been withdrawn. The setters have to rehandle these bricks in a slow double toss fashion, standing on the green bricks just set, making the brick unfit for face brick. With the pallet these partition walls are eliminated and setting can be continued until entire pallet of green brick is set.

In higher setting where brick are set thirty-eight courses high, it is the practice to set twelve courses when dry, set twelve more and dry and then fourteen courses on top of this. Before the setters can set the second twelve courses on top of the first twelve courses these bricks have to be dried at 300°. After drying bricks have to be cooled as they are too hot for setters to work on. This drying and cooling has to be repeated for each setting. Waste of drying heat will be eliminated in the one bench and also setters working on soft dry brick.

In burning brick in higher setting, top brick have to be over-burned in order to burn bricks in bottom. Over-burning increases consumption of oil. This loss will be overcome in lower setting of fifteen high. About sixty hours was required to burn brick in high setting. Bricks in low setting can be burned in eighteen hours. This is a saving of 40% in oil per thousand.

In taking burned bricks from kiln in higher setting, bricks have to be double handled. This requires two men. In lower setting one man can reach and handle the same amount of bricks.

In compartment kilns sealing of hoods at partitions would make this method of rapid burning of smaller amounts of bricks too costly. With the combination burner, sealing of hood is entirely eliminated as it is closed tight on all sides and does not have to be moved for drying, pre-heating, burning and cooling. In compartment kilns a different hood is used for each operation and has to be moved and sealed.

In compartment kiln operation it is necessary to have six men to move and seal hood. In burning kilns that finish burning at night, it would not be practical to have three crews so this burner could be moved and not have to wait until the next day. With the combination burner, one man can move it with the crane and start burning kiln of brick, thereby taking advantage of this lost burning time.

While I have shown and described a preferred form of the device, this is by way of illustration only, and I consider as my own all such modifications in construction as fairly fall within the scope of the appended claims.

I claim:

1. The method of drying, preheating, burning and cooling ceramic ware wherein a plurality of kilns are provided comprising the steps of stacking green ware on the pallet of one of said kilns, placing a hood over said ware and a similar hood over an empty pallet of another kiln, developing heat in said last named hood, withdrawing said heat and discharging it into said first named kiln, for drying of said ware over a period of time, increasing the heat in said second named hood for preheating said ware, placing green ware on the pallet of a third kiln and positioning a hood thereover, discontinuing the supply of heat to said first named kiln, reducing the heat of the second named burner hood and diverting the heat to said third named kiln for drying of ware within the hood of the third kiln, igniting the burners of the first named hood for burning of the ware and thereafter extinguishing said burners, withdrawing the heat from said first named kiln for discharge into the third named kiln for pre-heating of the ware and cooling of ware in the first named kiln, and thereafter removing said burner hood for disposition over ware of a further kiln, igniting the burner of said third named hood for burning of the ware, and removing the burner hood of the third kiln for disposition over green ware disposed upon a still further kiln, said steps being repeated throughout the plurality of kilns.

2. The method of claim 1, in which the flow of heated air from the final kiln is reversed for passage through preceding kilns.

3. Apparatus for drying, preheating, burning and cooling ceramic ware comprising a plurality of kilns arranged in tandem relation, a tunnel upon each side of the kilns and having communication therebetween, a damper means for controlling communication between the kilns and the tunnels, each tunnel having an opening in its upper wall normally closed, each opening being complemental to a respective kiln, a combined drying, preheating, burning and cooling hood positioned in sand sealed engagement with certain of said kilns, damper means in said tunnels complemental to each respective kiln, and a combined exhaust and blower means operatively engaged with paired openings of a tunnel of next adjacent kilns for withdrawing heated air from one kiln for discharge into the other upon opening of said last named damper means.

4. The structure of claim 3, in which an overhead trackway is provided extended the length of the plurality of kilns, a traversing hoist thereon, said hoist including means for raising respective hoods and moving the same to another kiln after cooling of the ware within a kiln.

5. The method of drying, preheating, burning and cooling ceramic ware wherein a plurality of kilns are provided comprising the steps of stacking green ware on the pallet of one of said kilns, placing a hood over said ware and a hood over an empty pallet of another kiln, developing heat in said last named hood, withdrawing said heat and discharging it into said first named kiln, placing green ware on the pallet of a third kiln and positioning a hood thereover, discontinuing the supply of heat to said first named kiln, diverting the heat of the second named burner hood to said third named kiln for drying of ware within the hood of the third kiln, igniting the burners of the first named hood for burning of the ware and thereafter extinguishing said burners, withdrawing the heat from said first named kiln for discharge into the third named kiln for pre-heating of the ware and cooling of ware in the first named kiln.

6. The method of drying, preheating, burning and cooling ceramic ware wherein a plurality of kilns are provided comprising the steps of stacking green ware on the pallet of one of said kilns, placing a hood over said ware and a hood over an empty pallet of another kiln, developing heat in said last named hood, withdrawing said heat and discharging it into said first named kiln, placing green ware on the pallet of a third kiln and positioning a hood thereover, discontinuing the supply of heat to said first named kiln, diverting the heat of the second named burner hood to said third named kiln for drying of ware within the hood of the third kiln, igniting the burners of the first named hood for burning of the ware and thereafter extinguishing said burners, withdrawing the heat from said first named kiln for discharge into the third named kiln for preheating of the ware and cooling of ware in the first named kiln, thereafter removing said first named burner hood, igniting the burner of said third named hood for burning of the ware, and removing the burner hood of the third kiln, said steps being repeated throughout the plurality of kilns.

FRANK C. MACKEY.

REFERENCES CITED

The following references are of record in the file of this patent:

UNITED STATES PATENTS

| Number | Name | Date |
|---|---|---|
| 1,513,778 | Wilson et al. | Nov. 4, 1924 |